March 17, 1953  F. T. WURMSER  2,631,872
QUICK COUPLING
Filed Jan. 24, 1949  2 SHEETS—SHEET 1
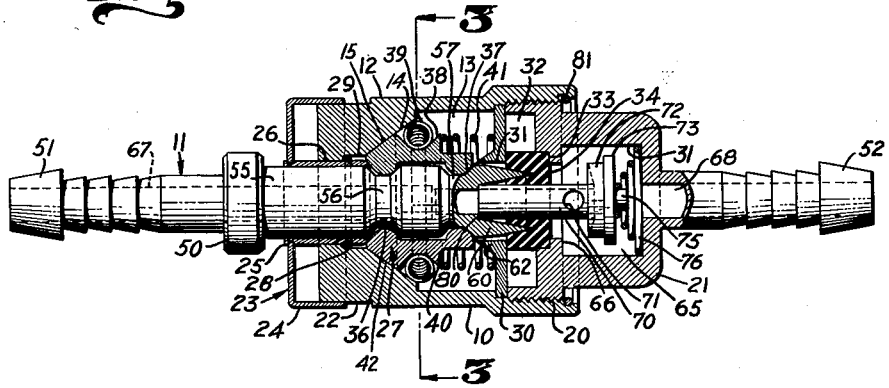
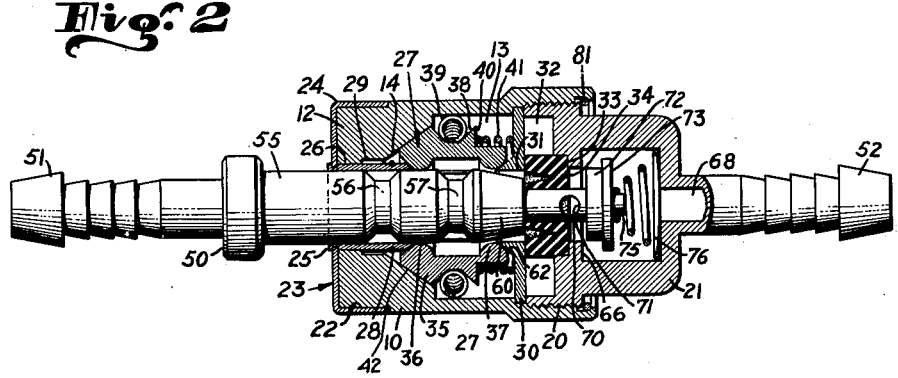
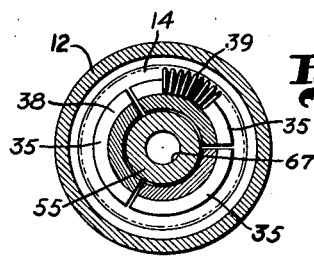
INVENTOR.
FRANKLIN T. WURMSER.
HUEBNER BEEHLER
WORREL HERZIG & CALDWELL
BY  ATTORNEYS March 17, 1953     F. T. WURMSER     2,631,872
QUICK COUPLING
Filed Jan. 24, 1949     2 SHEETS—SHEET 2
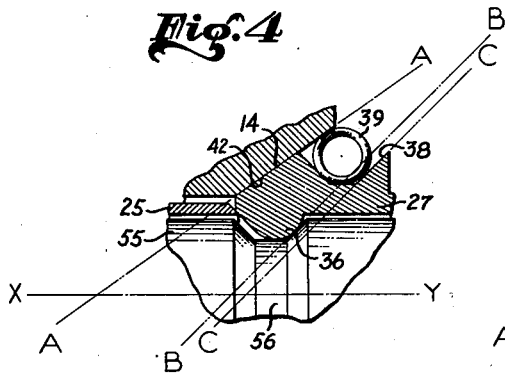
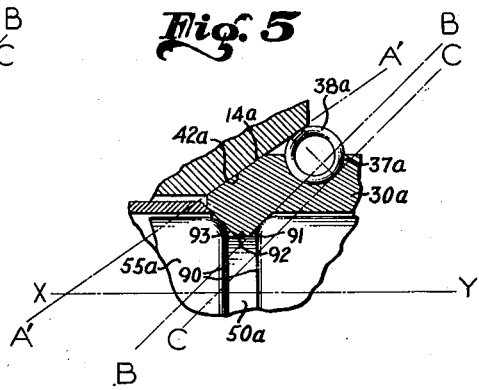
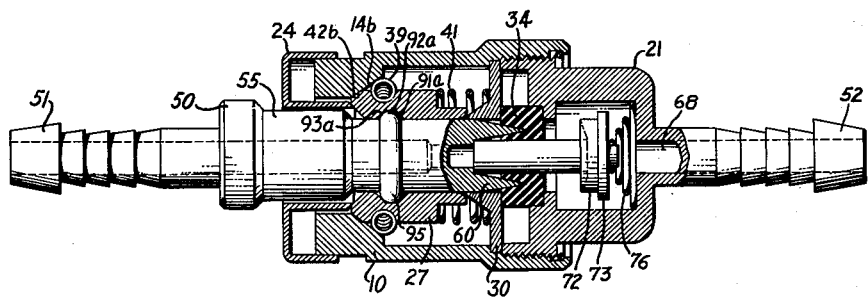
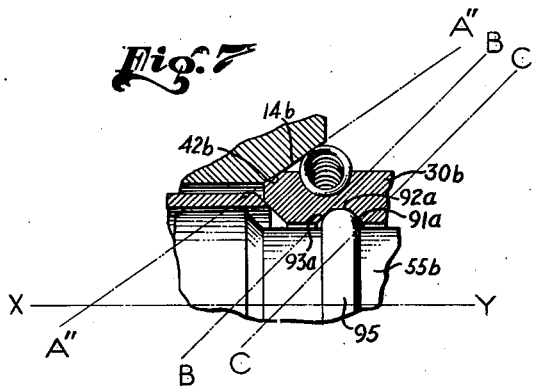
INVENTOR.
FRANKLIN T. WURMSER.
HUEBNER BEEHLER
WORREL HERZIG & CALDWELL
ATTORNEYS Patented Mar. 17, 1953

2,631,872

UNITED STATES PATENT OFFICE 2,631,872

QUICK COUPLING

Franklin T. Wurmser, Sherman Oaks, Calif.

Application January 24, 1949, Serial No. 72,454

4 Claims. (Cl. 285—169)

My invention relates to couplings for fluid conduits, such as pipes or hoses, and also to couplings or terminal links for cables, chain, rope and the like. It relates also to couplings which may function as swivel or rotating joints or connections.

Couplings of various types are known, such as screwed, flanged and slip-on fittings. Many of such fittings are inflexible in use, and can be taken apart only by the use of special tools or with considerable effort. Furthermore, most conventional fittings are coupled and uncoupled only by virtue of time consuming operations.

It is an object of my invention to provide a quick coupling of the slip-on type which may be readily coupled or uncoupled.

It is another object of my invention to provide a mechanical coupling which may be interlocked by telescoping complementary coupling members, and which may be disconnected by a releasing device associated with the coupling.

It is another object of my invention to provide a novel coupling mechanism of the plug-in or slip-on type including a chuck and a nipple which is automatically locked in the chuck.

It is another object of my invention to provide a coupling of new and improved construction comprising a nipple portion formed with an abutment, engageable in a chuck portion of such construction that axial tension upon the coupling members or component halves of the coupling will act to lock the nipple evermore tightly within the chuck.

Another object of my invention is to provide a chuck in one portion of a two-part coupler, such that a nipple formed with an abutment in one part may be readily inserted between the jaws of the chuck in the other part, but which, upon attempted retraction of the nipple, forces the chuck jaws into a firm, closed relationship against the abutment.

Another object of my invention is to provide a two-piece coupling, one part of which comprises a chuck having tapered jaws, and a chuck retainer having a frusto-conical recess complementary to said tapered jaws, such that when the chuck jaws are drawn in a given axial direction a closing action of the chuck results.

Another object of my invention is to provide a chuck locking mechanism in a coupling utilizing a unique relationship between the gripping surfaces of the chuck and complementary faces upon a chuck retainer, such that a nipple formed with an abutment can be readily slipped into the chuck, but can not be withdrawn from the chuck by virtue of an angular abutting relationship between the conical walls of the chuck retainer and the outer angle of the gripping jaws of the chuck.

An additional object of my invention is to provide chuck retainer of new and novel construction, a resilient means normally urging the chuck in a closed position, tapered jaws in the chuck permitting the facile insertion of a coupling element for lockable engagement between the jaws of the chuck and associated novel chuck releasing means.

Another object of my invention is to provide a coupling of the desirable character described, suitable for installation in a conduit system for readily coupling or uncoupling a section of said conduit system.

Another object of my invention is to provide a coupling of the character described which may function as a swivel.

Another object of my invention is to provide a coupling of the character described having associated therewith a fluid check valve to permit a fluid in the conduit system to flow through the coupling in only one direction and to stop the flow when the coupling is disunited.

Another object of my invention is to provide a coupling which may function as an interlocking electrical plug, socket or similar electrical connection.

A further object of my invention is to provide a locking coupling for use where swiftness of assembly and disassembly is desirable or necessary.

Other objects and advantages will appear and be brought out more fully from the following description, considered with reference to the accompanying drawings throughout which like parts are designated by like numerals.

In the drawings:

Figure 1 is a longitudinal section of my improved coupling showing the parts in interlocked relationship.

Figure 2 is a longitudinal section similar to Figure 1, but showing the parts in a position of partial disengagement with the male portion unlocked and partially retracted from the right hand portion.

Figure 3 is a sectional view on the line 3—3 of Figure 1.

Figure 4 is an enlarged fragmentary sectional view of the interlocking mechanism.

Figure 5 is a modified form of the interlocking mechanism shown in Figure 4.

Figure 6 is a longitudinal section of a modified form of my improved quick coupling.

Figure 7 is an enlarged fragmentary section showing the details of the interlocking mechanism in the modified form of my invention illustrated in Figure 6.

Referring more particularly to the drawings, I show a female coupling 10 and a male coupling 11 adapted to be thrust axially into the female coupling and retained therein, in a manner hereafter to be described.

Said female coupling comprises a barrel 12 defining a main chamber 13 therein and also formed with a frusto-conical bore 14 comprising the outer end of the main chamber.

The female coupling member 10 is provided with threads 20 at one end for the threaded reception of a valve retainer 21, and with an annular shoulder 22 slidably retaining a release collar 23 which may be connected to an annular manipulative release shoulder 24. A sleeve 25 is slidably confined in the female coupling 10, and is axially retractable into the bore 26 by means of the manipulative release 24 for the purpose of releasing the chuck 27, as will be hereinafter described. A locking ring 28 is provided upon the sleeve 25 and is slidable within an annular extension 29 of the frusto-conical bore 14 to limit the axial extension of the release collar 23. A ring 30 having an axial bore 31 is normally clamped between the female coupling 10 and the valve retainer 21, thereby defining a washer-retaining cavity 32. Formed in the wall of the valve retainer 21 is an annular seat 33 for confining a resilient washer 34.

The chuck 27 may have any number of jaws 35 collectively formed with retaining rings or grippers, such as 36 and 37, and an annular groove 38 seating an annular coil spring 39 normally urging the jaws 35 into closed position. An annular shoulder 40 is formed in one end of the jaws 35 providing a seat for the coil spring 41. The spring 41 normally urges the conical faces 42 of the jaws 35 axially against the walls of the frusto-conical bore 14. The annular coil spring 39 comprises coils of such a diameter that the spring 39 is normally aided and supported in position by abutment against the walls of the frusto-conical bore 14 when the chuck jaws 35 are in a closed position as shown in Figure 1.

The male coupling 11 may be formed with an annular stop 50 for the end of a hose (not shown) which may be slipped over the ends 51 and 52 of the male and female couplings, respectively. The interlocking end of the male coupling 11 comprises a nipple 55 formed with spaced annular grooves or abutments 56, 57 which normally receive the retaining rings 36 and 37 respectively when the male and female couplings are interlocked, as shown in Figure 1. The inner end 60 of the nipple 55 is tapered so that when the nipple 55 is thrust into the female coupling 10 the jaws 35 of the chuck 27 will be forced radially to permit the entrance of the nipple 55. In the interlocked position of the male and female coupling members, the end 60 is forced into seating engagement against the washer 34. To prevent the radial movement of the end 60 the ring 30 may be provided with a preferably tapered annular extension 62.

The valve retainer 21 forms a valve retaining chamber 65 and a valve seat 66 in axial alignment with the bores 67 and 68 in the male coupling 11 and the end 52 of the female coupling respectively.

The valve comprises a hollow stem 70 having a radial extension 71 to the hollow interior of the stem 70, a valve seat or plunger 72 designed to fit closely within the valve seat 66, and a stop or baffle plate 73. A pin 75 retains a spring 76 in centered position within the chamber 65. The spring 76 normally urges the valve in a closed position by urging the plunger 72 towards the seat 66 and against the washer 34 to check the flow of a fluid through the female coupling member 10, as from the left hand to the right hand side of Figures 1, 2 and 6, when the coupling members 10 and 11 are disunited. In the interlocked position of the coupling members 10 and 11, the valve 72 is forced to the right by engagement of the stem 70 with the annular shoulder 80, and there retained in open position; but upon the uncoupling of the male and female parts 10 and 11, the valve is forced into closed position so that the seat 72 seats against the washer 34, preventing the flow of the fluid through the valve from left to right.

The valve retainer 21 may be secured in place in its threaded engagement with the barrel 12 by means of a locking ring 81.

Figure 5 discloses a modified form of coupling in which the abutment between the male and female couplings comprises a nipple 55a formed with an annular groove 59a provided with rounded edges 90, and further comprising a chuck 30a, the jaws of which are formed with angular faces 91, 92 and 93 engageable in the annular groove 59a. The annular groove 37a formed in the jaws of the chuck 30a may be of arcuate cross section for the seating of the annular coil spring 38a which normally urges the jaws of the chuck 30a into closed position.

Figures 6 and 7 illustrate a modified form of abutment between the chuck 30b and the nipple 55b, in which the chuck 30b is formed with an annular recess having inner faces 91a, 92a and 93a normally engageable with the annular shoulder 95 formed upon the nipple 55b.

It is important to the proper operation of my coupling that any degree of tension upon opposite ends 51, 52, once the male and female parts 10 and 11 are interlocked, should not pull them apart. For preventing any such axial separation of the parts the chuck is constructed so that its preferably conical faces bear against the frusto-conical bore most desirably at such an angular relationship that any axial tension sets up forces urging the chuck jaws together thereby opposing the tendency of the nipple 55 to pull out of its engagement between said jaws.

It will be understood that the lines A—A, A'—A' or A"—A" drawn tangent to the point of contact between the conical chuck faces 42, 42a or 42b, respectively, and the frusto-conical bore 14, 14a or 14b, will correspond to the taper of the conical wall and frusto-conical bore, and that said lines will make angles, for example, A—A—Y (Figure 4) with the axis X—Y of the coupling, and that the more acute said angle A—A—Y becomes the greater will be the component of force directed toward the center of the coupling tending to force the jaws into closed relationship. The angle B—B—Y, for example, formed between the line B—B, drawn as a tangent to the point of abutment between the chuck jaws and the nipple 55, should be greater than the angle A—A—Y to prevent radial or opening movement of the jaws. Similarly, a line C—C passing through a point of contact between the annular coil spring 39 and its seat, parallel to the line B—B, should be adjusted to the line A—A to prevent said spring from being unseated.

It is contemplated that the abutments between the chuck and the nipple and between the chuck and the female coupling may be substantially parallel or may vary from one another 90° or more. Indeed the abutting faces need not be slanted but may be curved or straight lined in certain cases. Preferably, however, though not by way of limitation, the angle A—A—Y should be approximately 10° less than the angles B—B—Y or C—C—Y for easy and effective operation. And the line A—A may, if desired, make an angle (A—A—Y) from preferably slightly over zero degrees to slightly less than 90° with the line X—Y. It is also within the contemplation of my invention, however, to provide an abutment between the chuck and the nipple 55 such that the angles B—B—Y or C—C—Y are equal or vary 90° or more.

It is moreover contemplated that the line A—A, if projected upwardly from the axis X—Y as illustrated, will intersect the similarly extended lines B—B and C—C at a point short of infinity.

In the operation of the preferred embodiment of my improved coupling, a hose may be slipped over the ends 51, 52 of the male and female couplings, respectively, and the nipple 55 may be inserted through the sleeve 25 by forcing it axially into the female coupling 10 until the end 60 of the nipple 55 is firmly seated against the washer 34, in which position the jaws of the chuck will engage against the complementary grooved sections 56 and 57 of the nipple. The valve 72 will be forced into open position, as shown in Figure 1, by the engagement thereagainst of the shoulder 80 formed in the inner end of the nipple 55. A fluid entering the bore 68, as at the right hand side of Figure 1, will pass between the coils of the spring 76 and into the chamber 65 through the orifice or axial bore 71, the hollow stem 70 and thence through the bore 67 in the male coupling.

When it is desired to uncouple the fitting the release collar 23 may be forced inwardly from the position shown in Figure 1 to the position shown in Figure 2 where the inner end of the sleeve 25 engages the jaws of the chuck forcing them apart against the tension of the coil springs, a movement which is aided by the tapered form of the axial extension 62, as well as by the preferably tapered inner end of the sleeve 25. Upon the withdrawal of the nipple 55 the spring 76 will force the valve 72 against the seat 66 and the washer 34, preventing a further flow of fluid through the female coupling 10. The outer ends of the jaws 35 of the chuck are preferably flared for complementary engagement with the tapered inner end of the sleeve 25 for forcing the jaws of the chuck into open position when disengaging the parts.

In the interlocked or coupled relationship of the parts 10 and 11 an axial tension upon the ends 51 and 52 respectively, will force the outer surfaces of the jaws against the walls of the frusto-conical bore 14, thereby squeezing the jaws inwardly against the abutment 56 formed in the nipple 55. This closing action of the jaws will be aided by the tension of the springs 39 and 41, the first 39 of which will draw the jaws together centrally, and the second of which will force the jaws axially into closing contact with the frusto-conical bore 14.

It will be apparent that any number of abutments, such as that provided by the retaining ring 35 corresponding to recesses as 56, may be provided, and that such complementary abutments and recesses may be of any suitable form, or reversed so that the recess may be formed in the nipple 55, and the complementary shoulder in the chuck and vice versa. It will also be obvious that due to the taper of the frusto-conical bore 14, the chuck jaws will be drawn or pressed inwardly toward the longitudinal axis or center of the coupling and will be so pressed ever harder as the tension or "pull apart" forces are increased upon the male and female parts of the coupling.

Although I have herein shown and described my invention in what I have conceived to be the most practical and preferred embodiment, it is recognized that departures may be made therefrom within the scope of my invention, which is not to be limited to the details disclosed herein, but is to be accorded the full scope of the claims so as to embrace any and all equivalent devices.

Having thus described my invention, what I claim as new and desire to secure by Letters Patent is:

1. A coupling comprising male and female coupling members, said female coupling member being formed with an opening and defining a cavity tapered towards and communicating with said opening, a chuck loosely disposed within the tapered cavity, said male coupling member being formed with an abutment extensible through said opening and engageable with the chuck, said chuck upon the tensioning of the coupling being drawn by said abutment against the tapered walls of said chamber in a manner to close upon said abutment and oppose the disunion of the coupling, said chuck comprising a plurality of jaws, a first resilient means normally urging said jaws into a closed relationship, and a second resilient means co-operative with said first named resilient means encircling said jaws, normally pressed between said tapered walls and said chuck, and normally urging said jaws into a closed relationship.

2. A coupling comprising male and female coupling members, said female coupling member comprising threadedly joined ends and being formed with an opening and defining a cavity tapered towards and communicating with said opening, a chuck loosely disposed within the tapered cavity, said male coupling member being formed with an abutment extensible through said opening and engageable with the chuck, said chuck upon the tensioning of the coupling being drawn by said abutment against the tapered walls of said chamber in a manner to close upon said abutment and oppose the disunion of the coupling, said chuck comprising a plurality of jaws, resilient means normally urging said jaws into a closed relationship, said cavity being divided longitudinally by a disc into a main cavity and a washer retaining cavity, a resilient washer firmly held in said washer retaining cavity by means of said threadedly joined ends, the inner end of said male coupling member biting sealably in axial abutting engagement against said resilient washer in the interlocked position of the coupling.

3. A coupling comprising male and female coupling members, said female coupling member being formed with an opening and defining a cavity tapered towards and communicating with said opening, a chuck loosely disposed within the tapered cavity, said male coupling member being formed with an abutment extensible through said opening and engageable with the chuck, said chuck upon the tensioning of the coupling being drawn by said abutment against the tapered walls of said chamber in a manner to close upon said abutment and oppose the disunion of the coupling, said chuck comprising a plurality of jaws, a first resilient means normally urging said jaws into a closed relationship, and a second resilient means co-operative with said first named resilient means encircling said jaws, normally pressed between said tapered walls and said chuck, and normally urging said jaws into a closed relationship, at least one plane passing through a line of contact between said second resilient means and said jaws being parallel to a plane extended between the adjacent contacting faces of said jaws and said abutment on said male coupling member.

4. A coupling comprising male and female coupling members, said female coupling member being formed with an opening and defining a cavity tapered towards and communicating with said opening, a chuck loosely disposed within the tapered cavity, said male coupling member being formed with an abutment extensible through said opening and engageable with the chuck, said chuck upon the tensioning of the coupling being drawn by said abutment against the tapered walls of said chamber in a manner to close upon said abutment and oppose the disunion of the coupling, said chuck comprising a plurality of jaws, and a resilient means within said female coupling member engaging said jaws, said means being normally pressed between said tapered walls and said chuck, and normally urging said jaws into a closed relationship.

FRANKLIN T. WURMSER.

REFERENCES CITED

The following references are of record in the file of this patent:

UNITED STATES PATENTS

| Number | Name | Date |
|---|---|---|
| 751,345 | Saunders | Feb. 2, 1904 |
| 1,295,474 | Frazier et al. | Feb. 25, 1919 |
| 1,416,781 | Bevins | May 23, 1922 |
| 1,509,651 | Iftiger | Sept. 23, 1924 |
| 1,538,670 | Stanley | May 19, 1925 |
| 1,711,870 | Zerk | May 7, 1929 |
| 1,796,827 | Butler | Mar. 17, 1931 |
| 2,069,434 | Eastman | Feb. 2, 1937 |
| 2,070,013 | Krannak | Feb. 9, 1937 |
| 2,111,956 | Baldwin | Mar. 22, 1938 |
| 2,129,704 | Meyer | Sept. 13, 1938 |
| 2,400,817 | Fox et al. | May 21, 1946 |
| 2,533,637 | Tear | Dec. 12, 1950 |